United States Patent [19]

Kasenga et al.

[11] Patent Number: 4,946,707
[45] Date of Patent: Aug. 7, 1990

[54] METHOD FOR PRODUCING AN ALUMINUM OXIDE COATED MANGANESE ACTIVATED ZINC SILICATE PHOSPHOR

[75] Inventors: Anthony F. Kasenga, Towanda; Bella M. Dorfman, Athens, both of Pa.

[73] Assignee: GTE Products Corporation, Stamford, Conn.

[21] Appl. No.: 388,110

[22] Filed: Jul. 28, 1989

[51] Int. Cl.$^5$ ............................ B05D 5/06; B05D 5/12
[52] U.S. Cl. ........................................ 427/64; 427/67; 427/126.4; 427/215; 427/226; 313/486; 313/487; 313/489; 445/26
[58] Field of Search ............... 427/64, 67, 226, 126.4, 427/215; 313/486, 487, 489; 445/26

[56] References Cited

U.S. PATENT DOCUMENTS

| | | | |
|---|---|---|---|
| 4,585,673 | 4/1986 | Sigai | 427/213 |
| 4,710,674 | 12/1987 | Sigai | 313/489 |
| 4,803,400 | 2/1989 | Peters et al. | 313/489 |
| 4,806,389 | 2/1989 | Peters et al. | 427/67 |

*Primary Examiner*—Norman Morgenstern
*Assistant Examiner*—Roy V. King
*Attorney, Agent, or Firm*—L. Rita Quatrini; Robert E. Walter

[57] ABSTRACT

A method is disclosed for producing an aluminum oxide coated manganese activated zinc silicate phosphor which comprises forming a solution of $Al^{+3}$ ions in water with the concentration of the aluminum being from about 0.01 to about 0.30 moles/l, adding manganese activated zinc silicate phosphor to the aluminum solution to form a slurry wherein the amount of phosphor is about 0.7 to about 1.0 moles per liter of slurry with agitation for a sufficient time to result in aluminum ions being adsorbed onto the surfaces of the particles of the phosphor, separating the resulting phosphor with adsorbed aluminum ions from the resulting liquor, drying the phosphor with the adsorbed aluminum ions, firing the resulting dried phosphor at a temperature of from about 750° C. to about 850° C. in an oxidizing atmosphere for a sufficient time to oxidize the adsorbed aluminum ions to aluminum oxide and forming a coating of aluminum oxide on the particles of the phosphor, the coated phosphor having an increase in maintenance in a fluorescent lamp at about 100 hours over the phosphor absent the coating.

1 Claim, No Drawings

METHOD FOR PRODUCING AN ALUMINUM OXIDE COATED MANGANESE ACTIVATED ZINC SILICATE PHOSPHOR

This invention relates to a method for producing an aluminum oxide coated manganese activated zinc silicate phosphor by a solution process. Compared to vapor deposition processing, the process of the present invention is less expensive. The resulting phosphor has a uniform coating of aluminum oxide which results in improved maintenance over uncoated phosphors.

BACKGROUND OF THE INVENTION

Manganese activated zinc silicate phosphors are used in fluorescent lamps. In this application lamp maintenance or length of life of the phosphor is critical. Light output or lumens per watt of the phosphor decreases to a greater extent during lamp life than is desirable. This invention is concerned with a manganese activated zinc silicate phosphor having improved maintenance.

SUMMARY OF THE INVENTION

In accordance with one aspect of this invention, there is provided a method for producing an aluminum oxide coated manganese activated zinc silicate phosphor which comprises forming a solution of $Al^{+3}$ ions in water with the concentration of the aluminum being from about 0.01 to about 0.30 moles/l, adding manganese activated zinc silicate phosphor to the aluminum solution to form a slurry wherein the amount of phosphor is about 0.7 to about 1.0 moles per liter of slurry with agitation for a sufficient time to result in aluminum ions being adsorbed onto the surfaces of the particles of the phosphor, separating the resulting phosphor with adsorbed aluminion ions from the resulting liquor, drying the phosphor with the adsorbed aluminum ions, firing the resulting dried phosphor at a temperature of from about 750° C. to about 850° C. in an oxidizing atmosphere for a sufficient time to oxidize the adsorbed aluminum ions to aluminum oxide and form a coating of aluminum oxide on the particles of the phosphor, the coated phosphor having an increase in maintenance in a fluorescent lamp at about 100 hours over the phosphor absent the coating.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The present invention provides a method for improving the maintenance of a manganese activated zinc silicate phosphor when evaluated in a fluorescent lamp. The method relates to an aluminum solution treatment of the phosphor followed by annealing that results in a partial surface aluminum coverage of the phosphor.

The phosphor is a manganese activated zinc silicate phosphor. The phosphor itself can be from any source. A typical phosphor that is especially suited to the practice of the present invention is supplied by GTE Products Corporation under the name Type 2282 $Zn_2SiO_4$:Mn.

A solution is formed of $Al^{+3}$ ions in water. The preferred form of aluminum is aluminum nitrate. The amount of aluminum is about 0.01 to about 0.30 moles/l. It is preferred to use deionized water.

To the above described solution is added manganese activated zinc silicate phosphor to form a slurry wherein the amount of phosphor is about 0.7 to about 1.0 moles per liter of slurry and preferably about 0.9 moles per liter. This is done with agitation for a sufficient length of time to allow the aluminum ions to be adsorbed onto the surfaces of the phosphor particles in order to partially coat the particle surfaces of the phosphor. The concentration of aluminum ions is critical so that the aluminum ions can be sufficiently adsorbed. Most typically, the length of time of agitation is about 20 minutes. Some preferred conditions will be given in the example that follows.

The resulting phosphor with the adsorbed aluminum ions is then separated from the resulting liquor by standared methods and preferable by filtration.

It is preferred to leave the phosphor with adsorbed aluminum ions on the filter for a period of time of usually about 45 to about 60 minutes.

The phosphor with the adsorbed aluminum is then allowed to dry at a temperature of 100° C. in air.

The resulting dried phosphor is then fired at a temperature of from about 750° C. to about 850° C. and preferably about 800° C. in an oxidizing atmosphere preferably air for a sufficient time to oxidize the aluminum to aluminum oxide and form a coating of aluminum oxide on the particle surfaces of the phosphor. It is preferred to use quartz boats.

The fired phosphor is then allowed to cool.

The phosphor can now be blended to insure uniformity.

The method of the present invention produces a partial aluminum oxide coating on the manganese activated zinc silicate phosphor. This coating covers from about 40% to about 48% of the phosphor particle surfaces. The coating results in an increase in maintenance of the phosphor of at least about 14% and most typically about 14.4% over uncoated phosphors when the phosphor is evaluated in a fluorescent lamp.

To more fully illustrate this invention, the folowing non-limiting example is presented.

Example

Aluminum nitrate $(Al(NO_3)_3 \cdot H_2O)$ is dissolved in deionized water in the following amounts:

| # | g aluminum nitrate | D.I. Water |
| --- | --- | --- |
| 1 | 225 | 2 liters |
| 2 | 22.5 | 2 liters |
| 3 | 7.5 | 2 liters |
| Process control | 0 | 2 liters |

To each of the above solutions are added about 400 g of manganese activated zinc silicate phosphor ($Zn_2SiO_4$:Mn) to make slurries which are allowed to agitate for about 20 minutes. The slurries are then filtered to separate the partially coated phosphors from the respective liquors. The phosphors are allowed to remain on the respective filter papers for from about 45 to about 60 minutes. The partially coated phosphors are then dried at about 100° C. in air for about 4 hours. They are then fired at about 800° C. for about 2 hours in air in quartz boats. They are then cooled and blended.

The following data shows the maintenance of the above coated phosphors.

| # | 0 hr. lumen | 100 hr. lumen | maint | Delta lumens |
|---|---|---|---|---|
| 1 | 4524 | 3965 | 87.6 | 455 |
| 2 | 4652 | 4000 | 86.0 | 490 |
| 3 | 4803 | 4194 | 87.3 | 684 |
| Process control | 5190 | 3782 | 72.9 | 272 |
| | | 510 hr. lumen | maint | Delta lumens |
| 3 | | 2774 | 57.8 | −351 |
| Process control | | 2563 | 49.4 | −563 |

The data shows that all the coated phosphors have improved 100 hour maintenance. As the aluminum concentration increases the 0 hr. lumens decreases but due to improved maintenance at 100 hr. these coated phosphors exhibit improved 100 hr. lumens over the Process control. These trends are also shown at 510 hr. (#3 and Process control). For example, contrasting #'s 3 and Process control one can see that by treating with aluminum, a 412 lumen with a 14.4% maintenance advantage results at 100 hr. These same samples when contrasted at 510 hr. reveal a gain of 211 lumens with a maintenance gain of about 8.4%.

The surfaces of these samples characterized by Electron Spectroscopy for Chemical Analysis are given below:

| # | Zn | Si | Al | O | % Zn |
|---|---|---|---|---|---|
| 1 | 16 | 14 | 3.4 | 67 | 44 |
| 2 | 15 | 13 | 3.0 | 69 | 48 |
| 3 | 15 | 13 | 3.0 | 69 | 48 |
| Process control | 29 | 13 | — | 59 | — |

The analyses show that the coated samples do have aluminum on the surface, compared to none for the control. This aluminum is believed to preferentially cover the zinc site as shown by the reduction in the zinc attenuation. The surface zinc coverage by aluminum on #3 is about 48%.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing an aluminum oxide coated manganese activated zinc silicate phosphor, said method comprising:
   (a) forming a solution of $Al^{+3}$ ions from aluminum nitrate in water with the concentration of said aluminum being from about 0.01 to about 0.30 moles/l.
   (b) adding manganese activated zinc silicate phosphor to said aluminum solution to form a slurry wherein the amount of said phosphor is about 0.7 to about 1.0 moles per liter of said slurry with agitation for a sufficient time to result in aluminum ions being adsorbed onto the surfaces of the particles of said phosphor;
   (c) separating the resulting phosphor with adsorbed aluminion ions from the resulting liquor;
   (d) drying said phosphor with said adsorbed aluminum ions;
   (e) firing the resulting dried phosphor at a temperature of from about 750° C. to about 850° C. in an oxidizing atmosphere for a sufficient time to oxidize the adsorbed aluminum ions to aluminum oxide and forming a coating of aluminum oxide on the particles of said phosphor, said coated phosphor having an increase in maintenance in a fluorescent lamp at about 100 hours over said phosphor absent said coating.

* * * * *